United States Patent
Williams

(10) Patent No.: US 10,101,152 B1
(45) Date of Patent: Oct. 16, 2018

(54) OBJECT DETECTION SENSOR ALIGNMENT MONITORING SYSTEM

(71) Applicant: Caterpillar Inc., Peoria, IL (US)

(72) Inventor: Jamin T. Williams, Tucson, AZ (US)

(73) Assignee: Caterpillar Inc., Deerfield, IL (US)

( * ) Notice: Subject to any disclaimer, the term of this patent is extended or adjusted under 35 U.S.C. 154(b) by 0 days.

(21) Appl. No.: 15/473,692

(22) Filed: Mar. 30, 2017

(51) Int. Cl.
*B60Q 1/00* (2006.01)
*G01B 21/24* (2006.01)
*B60Q 9/00* (2006.01)
*E02F 9/26* (2006.01)
*A01D 41/127* (2006.01)
*B60P 1/267* (2006.01)

(52) U.S. Cl.
CPC ............ *G01B 21/24* (2013.01); *A01D 41/127* (2013.01); *B60P 1/267* (2013.01); *B60Q 9/00* (2013.01); *E02F 9/26* (2013.01)

(58) Field of Classification Search
CPC ....... G01B 21/24; B60P 1/267; A01D 41/127; A01D 34/006; A01D 34/008; A01D 34/74; A01D 2101/00; B60Q 9/00; E02F 9/26
USPC ....................................... 340/679–686.6, 438
See application file for complete search history.

(56) References Cited

U.S. PATENT DOCUMENTS

| | | | |
|---|---|---|---|
| 4,003,482 A * | 1/1977 | Cheze | B66C 23/90 212/278 |
| 4,488,249 A | 12/1984 | Baker | |
| 5,906,655 A | 5/1999 | Fan | |
| 7,346,452 B2 | 3/2008 | Ford et al. | |
| 7,772,969 B2 * | 8/2010 | Prohaska | B62D 33/0633 180/326 |
| 7,831,362 B2 | 11/2010 | Ishibashi et al. | |
| 8,589,015 B2 | 11/2013 | Willis et al. | |
| 9,234,758 B2 | 1/2016 | Friend et al. | |
| 9,235,214 B2 * | 1/2016 | Anderson | G05D 1/0221 |
| 9,541,420 B2 | 1/2017 | Friend | |
| 2008/0001771 A1 * | 1/2008 | Faoro | B60R 25/00 340/679 |
| 2017/0202136 A1 * | 7/2017 | Dombrowski | A01D 34/006 |
| 2018/0001729 A1 * | 1/2018 | Goffer | B60G 17/01908 |

* cited by examiner

*Primary Examiner* — Anh V La
(74) *Attorney, Agent, or Firm* — Miller, Matthias & Hull

(57) ABSTRACT

A machine includes a chassis and an object detection sensor alignment monitoring system. The monitoring system includes a first sensor module coupled to an object detection sensor. The first sensor module measures values of object detection sensor pitch, roll, and yaw. The monitoring system also includes a second sensor module coupled to the chassis. The second sensor module measures values of chassis pitch, roll, and yaw. The monitoring system further includes a control unit. The control unit compares the measured values of the object detection sensor and chassis pitch, roll, and yaw. The control unit determines whether the measured values are within a predefined tolerance. Further, the control unit generates an alert if the measured values of the object detection sensor and chassis pitch, roll, and yaw are beyond the predefined tolerance.

20 Claims, 3 Drawing Sheets

OBJECT DETECTION SENSOR ALIGNMENT MONITORING SYSTEM

TECHNICAL FIELD

The present disclosure relates to a system and a method to monitor alignment of an object detection sensor coupled to a machine.

BACKGROUND

Machines such as, but not limited to, mining trucks, wheel loaders, track type tractors, excavators, and the like, perform a variety of operations at a worksite. These operations may include, for example, digging, dumping, and transportation of materials. The machines generally include autonomous or semi-autonomous machines; as such machines can operate at worksites that are unsuitable for human presence. Further, such machines improve an overall productivity of an operation.

Autonomous or semi-autonomous machines are generally controlled by an operator or a machine control system that is located at a remote location, such as a remote monitoring station. The operator or the machine control systems generally receive feedback from various sensors of the machine in order to ensure operation of the machine as per an expected manner. Such sensors may include, for example, position sensors, object detection sensors, and the like. If there is an error in an alignment or operation of one of the sensors, the operator or the machine control system may receive faulty feedback from the machine. Typically, the sensors of the machine are periodically checked by a personnel in order to ensure that accurate machine feedback is received at the remote location. However, in some cases, the errors in one of the sensors may occur between two periodic checks, and there is no way to know until the next check on the machine is performed, which is not desirable.

U.S. Pat. No. 9,541,420 describes a system for determining an error in a sensed position of a machine includes a position sensing system, a dead reckoning system, and a controller. The controller is configured to determine a difference between a sensed position and a calculated position determined by dead reckoning. The difference is compared to an error threshold defining a maximum acceptable distance between the sensed position of the machine and the calculated position of the machine and an error signal generated if the difference exceeds the error threshold. A pair of offset dead reckoning processes may be used.

SUMMARY OF THE DISCLOSURE

In one aspect of the present disclosure, a machine is provided. The machine includes a chassis. The machine also includes an object detection sensor alignment monitoring system. The monitoring system includes a first sensor module coupled to an object detection sensor on the machine. The first sensor module is configured to measure values of object detection sensor pitch, roll, and yaw. The monitoring system also includes a second sensor module coupled to the chassis of the machine. The second sensor module is configured to measure values of chassis pitch, roll, and yaw. The monitoring system further includes a control unit communicably coupled to each of the first and second sensor modules. The control unit is configured to receive the measured values of the object detection sensor pitch, roll, and yaw from the first sensor module. The control unit is also configured to receive the measured values of the chassis pitch, roll, and yaw from the second sensor module. The control unit is further configured to compare the measured values of the object detection sensor and chassis pitch, roll, and yaw received from the first and second sensor modules. The control unit is configured to determine whether the measured values are within a predefined tolerance based on the comparison. The control unit is also configured to generate an alert if the measured values of the object detection sensor and chassis pitch, roll, and yaw are beyond the predefined tolerance. The alert is indicative of a misalignment of the object detection sensor with respect to the chassis of the machine.

In another aspect of the present disclosure, an object detection sensor alignment monitoring system associated with a machine is provided. The monitoring system includes a first sensor module coupled to an object detection sensor on the machine. The first sensor module is configured to measure values of object detection sensor pitch, roll, and yaw. The monitoring system also includes a second sensor module coupled to a chassis of the machine. The second sensor module is configured to measure values of chassis pitch, roll, and yaw. The monitoring system further includes a control unit communicably coupled to each of the first and second sensor modules. The control unit is configured to receive the measured values of the object detection sensor pitch, roll, and yaw from the first sensor module. The control unit is also configured to receive the measured values of the chassis pitch, roll, and yaw from the second sensor module. The control unit is further configured to compare the measured values of the object detection sensor and chassis pitch, roll, and yaw received from the first and second sensor modules. The control unit is configured to determine whether the measured values are within a predefined tolerance based on the comparison. The control unit is also configured to generate an alert if the measured values of the object detection sensor and chassis pitch, roll, and yaw are beyond the predefined tolerance. The alert is indicative of a misalignment of the object detection sensor with respect to the chassis of the machine.

In yet another aspect of the present disclosure, a method to monitor alignment of an object detection sensor coupled to a machine is provided. A first sensor module is coupled to the object detection sensor. The first sensor module is configured to measure values of object detection sensor pitch, roll, and yaw. The method includes receiving, by a control unit, the measured values of the object detection sensor pitch, roll, and yaw from the first sensor module. The method also includes receiving, by the control unit, measured values of chassis pitch, roll, and yaw from a second sensor module. The second sensor module is coupled to a chassis of the machine. The method further includes comparing, by the control unit, the measured values of the object detection sensor and chassis pitch, roll, and yaw received from the first and second sensor modules. The method includes determining, by the control unit, whether the measured values are within a predefined tolerance based on the comparison. The method also includes generating an alert, by the control unit, if the measured values of the object detection sensor and chassis pitch, roll, and yaw are beyond the predefined tolerance. The alert is indicative of a misalignment of the object detection sensor with respect to the chassis of the machine.

Other features and aspects of this disclosure will be apparent from the following description and the accompanying drawings.

DETAILED DESCRIPTION

Reference will now be made in detail to specific aspects or features, examples of which are illustrated in the accompanying drawings. Wherever possible, corresponding or similar reference numbers will be used throughout the drawings to refer to the same or corresponding parts.

Figure 1:
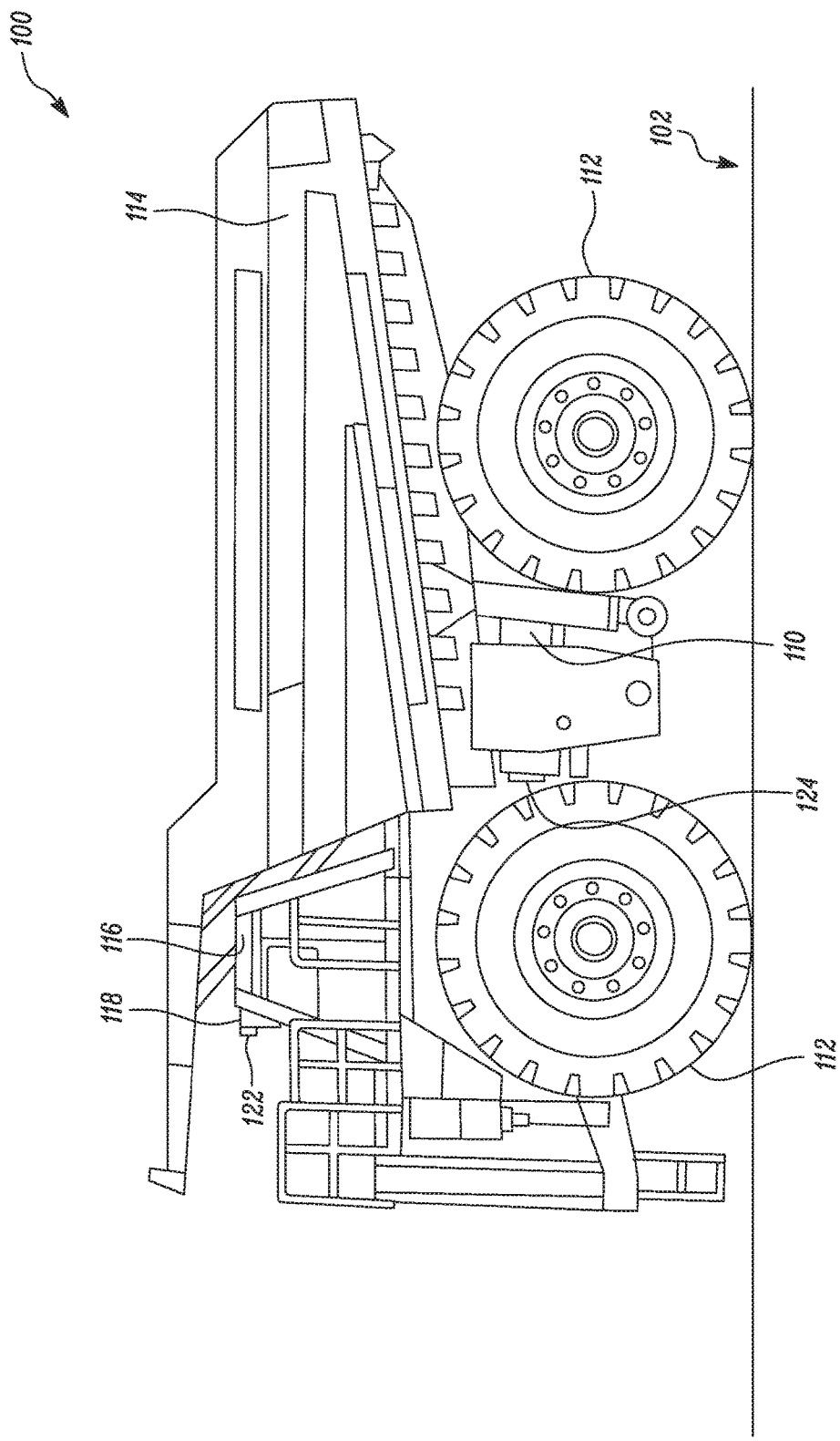
FIG. 1 is a side view of a machine, according to one embodiment of the present disclosure.

FIG. 1 illustrates a side view of a machine 100, according to an exemplary embodiment of the present disclosure. The machine 100 may be embodied as an autonomous or semi-autonomous machine, without any limitations. In the illustrated embodiment, the machine 100 is embodied as a mining truck operating at a worksite 102. In alternative embodiments, the machine 100 may include an excavator, a dozer, a harvester, a backhoe or other types of machines known in the art. Although a single machine 100 is shown operating at the worksite 102, it should be noted that multiple machines may operate at the worksite 102, without any limitations. The worksite 102 may include, for example, a mine site, a landfill, a quarry, a construction site, or any other type of worksite. Further, the machine 100 may perform one or more than one type of operation associated with an industry such as mining, construction, farming, transportation, or any other industry known in the art.

The machine 100 is communicably coupled to a remote monitoring station 104 (shown in FIG. 2) that is situated at a location exterior to or far from the worksite 102. An operator of the machine 100 may be seated at the remote monitoring station 104. The remote monitoring station 104 may include various operator input devices for controlling and monitoring operations of the machine 100. In one example, the remote monitoring station 104 includes a machine control system 106 (shown in FIG. 2) that constantly receives feedback from various sensors on the machine 100 and/or the worksite 102 to check whether the machine 100 is performing in an intended manner. The machine control system 106 may also be communicably coupled to a Machine Control unit (MCU) present on-board the machine 100. The machine control system 106 may include a control unit (not shown) that receives and processes information from various sensors associated with the machine 100.

The remote monitoring station 104 may also include an output device that provides feedback to the operator regarding various operating parameters of the machine 100. The output device may be communicably coupled to the machine control system 106 to receive and display data processed by the control unit of the machine control system 106. In another example, the output device may be communicably coupled with the sensors associated with the machine 100 or the on-board MCU to display the feedback received from the sensors associated with the machine 100, without any limitations.

The machine 100 includes a chassis 110. The chassis 110 rotatably supports a set of ground engaging members 112 each of which is embodied as a wheel in the illustrated embodiment of FIG. 1. The ground engaging members 112 rotate about their respective axes thereby propelling the machine 100 on a ground surface. Alternatively, it can be contemplated to embody the set of ground engaging members 112 in the form of tracks (not shown) such that the tracks propel the machine 100.

The machine 100 further includes a load carrier 114 for carrying material for transportation purposes. The load carrier 114 is coupled with the chassis 110, and may be tilted between a lowered position, as shown, and a lifted position, to dump material from the load carrier 114 in a conventional manner. The machine 100 may further include an engine (not shown) for providing propulsion power to the machine 100. The engine may be an internal combustion engine such as a compression ignition diesel engine, but in other embodiments the engine might include a gas turbine engine. A cab 116 is mounted to the chassis 110. When the machine 100 is embodied as a semi-autonomous machine, an operator of the machine 100 is seated within the cab 116 to perform one or more machine operations. The cab 116 includes a number of input devices, such as levers, buttons, joysticks, and the like, to perform one or more machine operations. Further, the cab 116 may also include an output device that gives feedback to the operator regarding various machine parameters.

Further, the machine 100 includes an object detection sensor 118. The object detection sensor 118 detects and reports presence of objects in a vicinity of the machine 100. The object detection sensor 118 may include any known visual data capturing device for scanning an area surrounding the machine 100 and capturing visual data of the machine 100, or the worksite 102 at which the machine 100 operates. In one example, the object detection sensor 118 is embodied as a LIDAR. Alternatively, the object detection sensor 118 may include any optical instrument for recording and/or image capturing. Accordingly, the object detection sensor 118 may embody a still camera, a camcorder, a video camera, a Closed-Circuit Television (CCTV) camera, and the like.

The object detection sensor 118 is mounted at a location on the machine 100 such that the object detection sensor 118 captures clear and obstruction free visual data. In the illustrated example, the object detection sensor 118 is coupled at a front end of the cab 116 of the machine 100. Alternatively, the object detection sensor 118 may be mounted at a rear end of the cab 116, on a grill at a front end of the machine 100, or at a rear end of the machine 100, without limiting the scope of the present disclosure.

Figure 2:
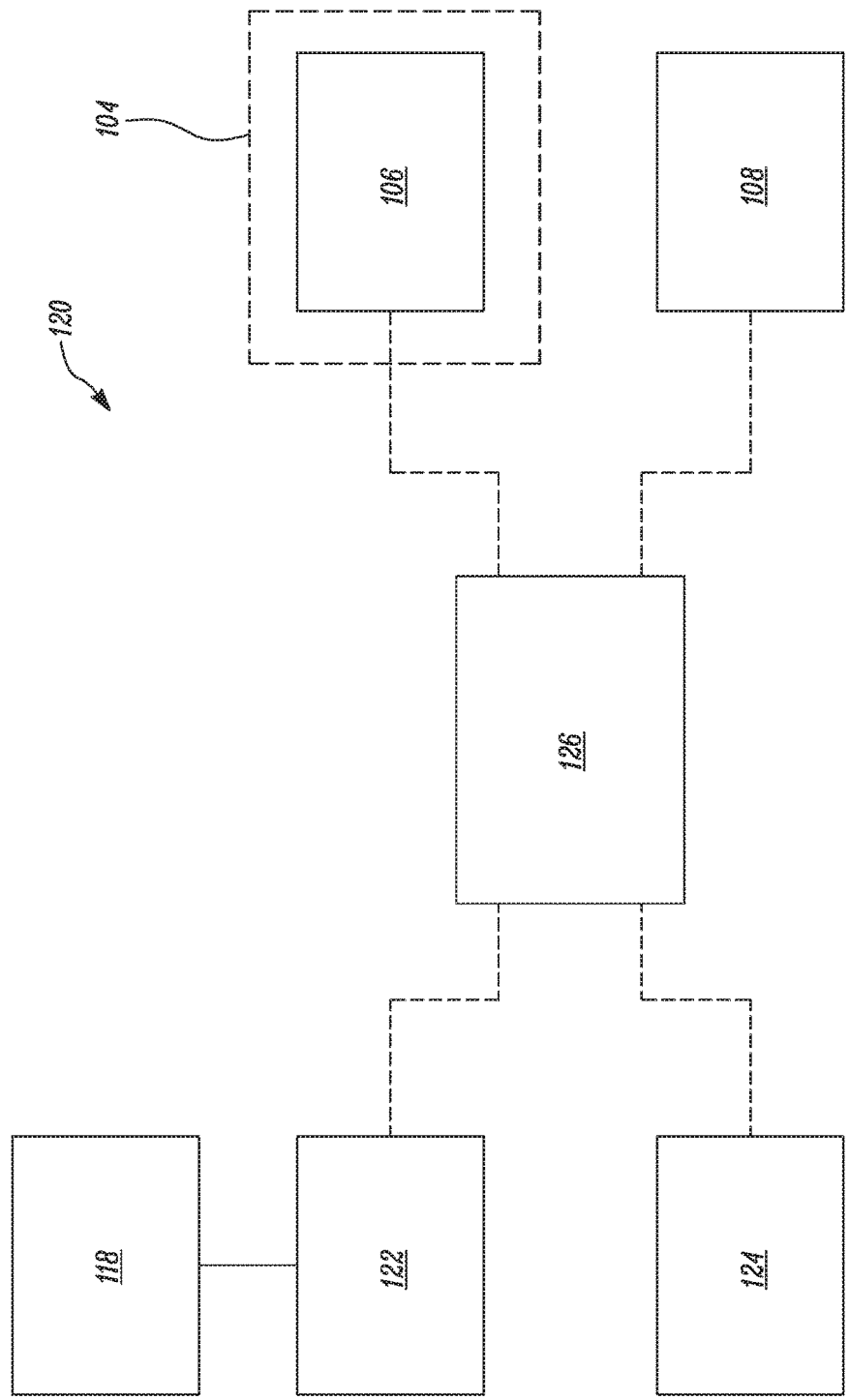
FIG. 2 is a block diagram of an object detection sensor alignment monitoring system coupled to the machine, according to one embodiment of the present disclosure.

During operation of the machine 100, the object detection sensor 118 may misalign with respect to the chassis 110 of the machine 100. As a result, the object detection sensor 118 may report incorrect data of the area surrounding the machine 100. Referring to FIG. 2, the present disclosure relates to an object detection sensor alignment monitoring system 120, hereinafter interchangeably referred to as "monitoring system 120". The monitoring system 120 monitors an alignment of the object detection sensor 118 that is coupled to the machine 100 (see FIG. 1). More particularly, the monitoring system 120 disclosed herein detects if the object detection sensor 118 misaligns with respect to the chassis 110 (see FIG. 1), and provides an alert to a user, such as the operator of the machine 100 and/or the machine control system 106 located at the remote monitoring station 104 regarding the misalignment of the object detection sensor 118.

The monitoring system 120 includes a first sensor module 122. The first sensor module 122 is coupled to the object detection sensor 118. The first sensor module 122 measures values of object detection sensor pitch, roll, and/or yaw. The "object detection sensor pitch, roll, and yaw" disclosed herein are values of a pitch angle, a roll angle, and a yaw angle of the machine 100 that are measured by the first sensor module 122 coupled to the object detection sensor 118. Further, it should be noted that the first sensor module 122 may measure the value of any one of the object detection sensor pitch, roll, and yaw or the values of each of the object detection sensor pitch, roll, and yaw, based on application requirements.

In one example, the first sensor module 122 includes an Inertial Measurement Unit (IMU) for measuring the values of the object detection sensor pitch, roll, and/or yaw. The IMU may include an accelerometer, a gyroscope, a magnetometer, or a combination thereof. Further, the first sensor module 122 may also include a Global Positioning System (GPS). The GPS is used to detect a position of the machine 100 with respect to the worksite 102. In some examples, the first sensor module 122 may also include ground speed sensors, without any limitations.

In another example, the first sensor module 122 may include a pitch sensor, a roll sensor, or a yaw sensor for measuring the values of the object detection sensor pitch, roll, or yaw, respectively. The pitch sensor, yaw sensor, or roll sensor may embody a one axis accelerometer or any known multi axis sensor that measures the values of the object detection sensor pitch, roll, and yaw, without any limitations.

The monitoring system 120 also includes a second sensor module 124. The second sensor module 124 is coupled to the chassis 110 of the machine 100. The second sensor module 124 measures values of chassis pitch, roll, and/or yaw. The "chassis pitch, roll, and yaw" disclosed herein are values of the pitch angle, the roll angle, and the yaw angle of the machine 100 that are measured by the second sensor module 124 coupled to the chassis 110. Further, it should be noted that the second sensor module 124 may measure the value of any one of the chassis pitch, roll, and yaw or the values of each of the chassis pitch, roll, and yaw, based on application requirements.

In one example, the second sensor module 124 includes an IMU that is coupled to the chassis 110 and measures the values of the chassis pitch, roll, and/or yaw of the machine 100. Alternatively, the second sensor module 124 may include a pitch sensor, a roll sensor, and/or a yaw sensor that measures the values of the chassis pitch, roll, and/or yaw, respectively. For example, the pitch sensor, roll sensor, and yaw sensor may embody a one axis accelerometer or any known multi axis sensor that measures the values of the chassis pitch, roll, and yaw, without any limitations. In one example, the pitch sensor, roll sensor, and/or yaw sensor may embody a digital sensor that is coupled to the chassis 112 of the machine 100 and calibrated for measuring the chassis pitch roll, and/or yaw, respectively.

The monitoring system 120 also includes a control unit 126. The control unit 126 is communicably coupled to each of the first and second sensor modules 122, 124, and is adapted to receive signals therefrom. The control unit 126 receives the measured values of the object detection sensor pitch, roll, and/or yaw of the machine 100 from the first sensor module 122. Also, the control unit 126 receives the measured values of the chassis pitch, roll, and/or yaw from the second sensor module 124. Further, the control unit 126 compares the measured values of the object detection sensor and chassis pitch, roll, and/or yaw received from the first and second sensor modules 122, 124, respectively. More particularly, the control unit 126 may store and run an algorithm or program to compare the measured values of the object detection sensor and chassis pitch, roll, and/or yaw.

Based on the comparison, the control unit 126 determines whether the measured values are within a predefined tolerance. It should be noted that a range of the predefined tolerance may vary from one machine to another. In one example, the predefined tolerance depends on a vertical distance between the first sensor module 122 and the second sensor module 124. As the vertical distance between the first and second sensor modules 122, 124 increases, the predefined tolerance increases. In one example, a range of the predefined tolerance is 1% to 2% of the respective chassis pitch, roll, and/or yaw.

Further, if the measured values of the object detection sensor and chassis pitch, roll, and/or yaw are beyond the predefined tolerance, the control unit 126 generates an alert. The alert is indicative of the misalignment of the object detection sensor 118 with respect to the chassis 110 of the machine 100. An output device 108 of the monitoring system 120 generates the alert to notify the operator regarding the misalignment of the object detection sensor 118 with respect to the chassis 110. The output device 108 may be present at the remote monitoring station 104 or at the cab 116. In another example, the output device 108 may be carried by the operator of the machine 100.

The output device 108 may embody a display device such as a monitor, a handheld/portable device such as a tablet or a smartphone, or any other known device having a screen that provides visual output pertaining to the misalignment of the object detection sensor 118. In such an example, the output device 108 may display a visual notification, such as a text message, to alert the operator regarding the misalignment of the object detection sensor 118. Alternatively, the output device 108 may include speakers that provide audio output. In such an example, the notification may include an audio notification for alerting the operator regarding the misalignment of the object detection sensor 118, without any limitations.

In another example, the control unit 126 sends the alert notification to the machine control system 106 located at the remote monitoring station 104 regarding the misalignment of the object detection sensor 118. In such an example, the alert notification may include a diagnostic code that is sent to the machine control system 106. Further, when a personnel logs in to the machine control system 106 and runs a maintenance schedule or a periodic check-up of the machine 100, the operator may be made aware of the misalignment of the object detection sensor 118.

In one example, the MCU that is present on-board the machine 100 may perform the intended functions of the control unit 126, without any limitations. Further, the control unit 126 may embody a single microprocessor or multiple microprocessors. Numerous commercially available microprocessors can be configured to perform the functions of the control unit 126. The control unit 126 may include all the components required to run an application such as, for example, a memory, a secondary storage device, and a processor, such as a central processing unit or any other means known in the art. Various other known circuits may be associated with the control unit 126, including power supply circuitry, signal-conditioning circuitry, communication circuitry, and other appropriate circuitry.

INDUSTRIAL APPLICABILITY

The present disclosure relates to the object detection sensor alignment monitoring system 120. The monitoring system 120 referred to herein includes fewer components that are easily available, thereby making the monitoring system 120 simple for installation and application. Further, the monitoring system 120 can be easily retrofitted to any existing machine. The monitoring system 120 reduces downtime associated with the machine 100, as the monitoring system 120 notifies the operator in real time regarding the misalignment of the object detection sensor 118, and the operator does not have to wait till the next scheduled periodic checkup to know about the misalignment. Also, the monitoring system 120 eliminates manual checkup of the object detection sensor 118 at intervals, thereby reducing time and efforts. Additionally, errors caused due to inefficiency of a personnel in checking the misalignment of the object detection sensor 118 is eliminated as the monitoring system 120 does not include manual interference for monitoring the misalignment.

Figure 3:
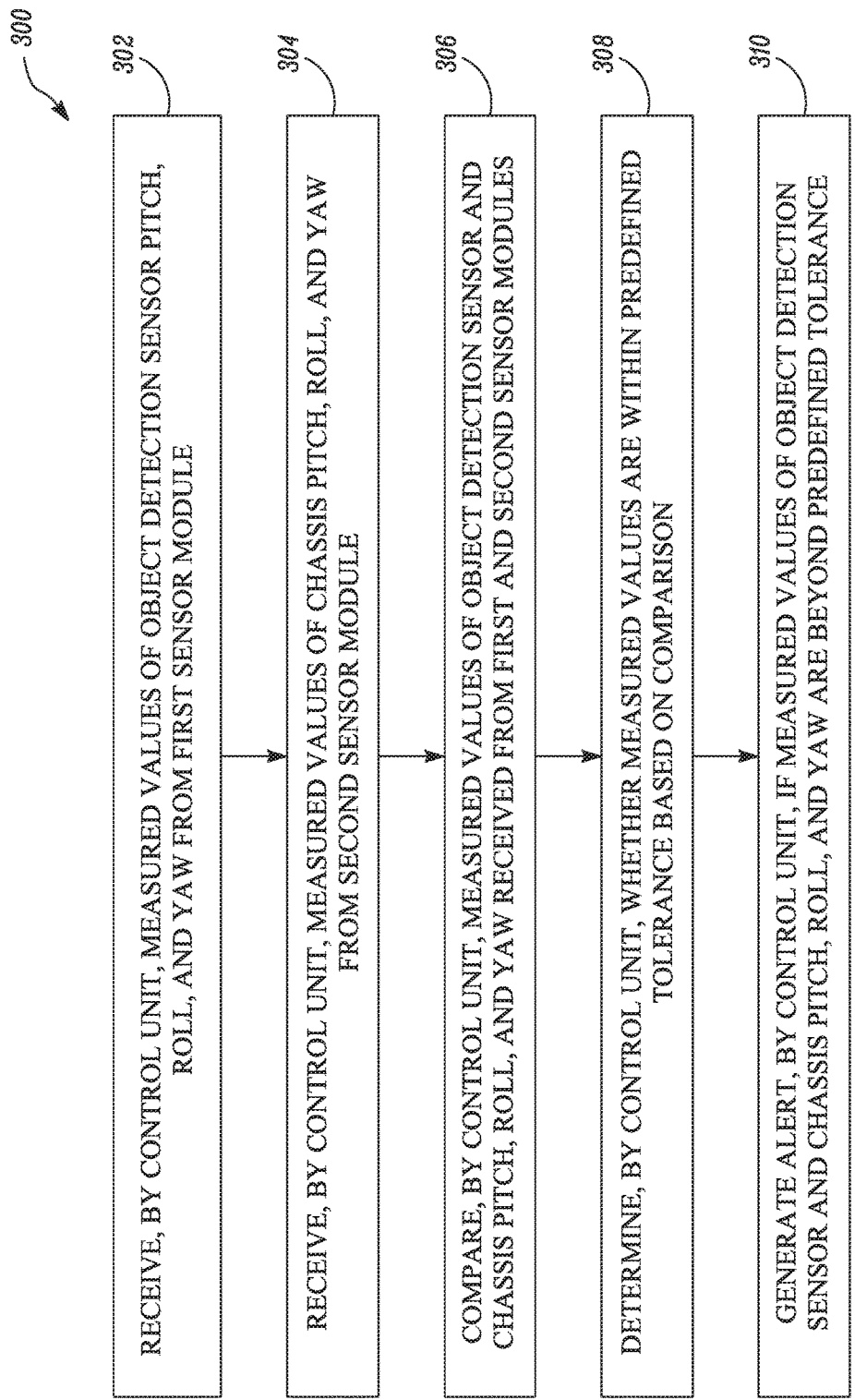
FIG. 3 is a flowchart for a method of monitoring alignment of the object detection sensor.

A method 300 to monitor the alignment of the object detection sensor 118 coupled to the machine 100 will now be explained in reference to FIG. 3. The object detection sensor 118 is coupled with the first sensor module 122 that measures the values of the object detection sensor pitch, roll, and/or yaw. Further, the first sensor module 122 includes the IMU and the object detection sensor 118 includes the LIDAR, without any limitations. At step 302, the control unit 126 receives the measured values of the object detection sensor pitch, roll, and/or yaw from the first sensor module 122.

At step 304, the control unit 126 receives the measured values of the chassis pitch, roll, and/or yaw from the second sensor module 124. The second sensor module 124 is coupled to the chassis 110 of the machine 100. Further, the second sensor module 124 may include any one of the pitch sensor, the roll sensor, the yaw sensor, or the IMU, without any limitations. At step 306, the control unit 126 compares the measured values of the object detection sensor and chassis pitch, roll, and/or yaw received from the first and second sensor modules 122, 124. At step 308, the control unit 126 determines whether the measured values are within the predefined tolerance.

At step 310, the control unit 126 generates the alert, if the measured values of the object detection sensor and chassis pitch, roll, and/or yaw are beyond the predefined tolerance. The alert is indicative of the misalignment of the object detection sensor 118 with respect to the chassis 110 of the machine 100. Further, the alert notifies the operator of the machine 100 or the machine control system 106 located at the remote monitoring station 104 regarding the misalignment of the object detection sensor 118 with respect to the chassis 110 of the machine 100. The alert may include the diagnostic code, the visual notification, and the audio notification, without any limitations.

While aspects of the present disclosure have been particularly shown and described with reference to the embodiments above, it will be understood by those skilled in the art that various additional embodiments may be contemplated by the modification of the disclosed machines, systems and methods without departing from the spirit and scope of what is disclosed. Such embodiments should be understood to fall within the scope of the present disclosure as determined based upon the claims and any equivalents thereof.

What is claimed is:

1. A machine comprising:
    an object detection sensor mounted on the machine, the object detection sensor configured to detect and report the presence of objects in a vicinity of the machine;
    a chassis, and
    an object detection sensor alignment monitoring system including:
        a first sensor module coupled to the object detection sensor on the machine, the first sensor module configured to measure values of object detection sensor pitch, roll, and yaw;
        a second sensor module coupled to the chassis of the machine, the second sensor module configured to measure values of chassis pitch, roll, and yaw; and
        a control unit communicably coupled to each of the first and second sensor modules, the control unit configured to:
            receive the measured values of the object detection sensor pitch, roll, and yaw from the first sensor module;
            receive the measured values of the chassis pitch, roll, and yaw from the second sensor module;
            compare the measured values of the object detection sensor and chassis pitch, roll, and yaw received from the first and second sensor modules;
            determine whether the measured values are within a predefined tolerance based on the comparison; and
            generate an alert if the measured values of the object detection sensor and chassis pitch, roll, and yaw are beyond the predefined tolerance, wherein the alert is indicative of a misalignment of the object detection sensor with respect to the chassis of the machine.

2. The machine of claim 1, wherein the machine is either one of an autonomous machine and a semi-autonomous machine and the alert notifies at least one of an operator of the machine and a machine control system located at a remote monitoring station regarding the misalignment of the object detection sensor with respect to the chassis of the machine.

3. The machine of claim 2, wherein the alert includes at least one of a diagnostic code, a visual notification, and an audio notification.

4. The machine of claim 1, wherein the first sensor module includes an Inertial Measurement Unit (IMU).

5. The machine of claim 1, wherein the first sensor module includes a pitch sensor, a roll sensor, and a yaw sensor.

6. The machine of claim 1, wherein the object detection sensor includes a LIDAR.

7. The machine of claim 1, wherein the second sensor module includes at least one of a pitch sensor, a roll sensor, a yaw sensor, and an IMU.

8. An object detection sensor alignment monitoring system associated with a machine, the monitoring system comprising:
    a first sensor module coupled to an object detection sensor on a machine, the first sensor module configured to measure values of object detection sensor pitch, roll, and yaw;
    a second sensor module coupled to a chassis of the machine, the second sensor module configured to measure values of chassis pitch, roll, and yaw; and
    a control unit communicably coupled to each of the first and second sensor modules, the control unit configured to:
        receive the measured values of the object detection sensor pitch, roll, and yaw from the first sensor module;
        receive the measured values of the chassis pitch, roll, and yaw from the second sensor module;
        compare the measured values of the object detection sensor and chassis pitch, roll, and yaw received from the first and second sensor modules;
        determine whether the measured values are within a predefined tolerance based on the comparison; and generate an alert if the measured values of the object detection sensor and chassis pitch, roll, and yaw are beyond the predefined tolerance, wherein the alert is indicative of a misalignment of the object detection sensor with respect to the chassis of the machine.

9. The monitoring system of claim 8, wherein the alert notifies at least one of an operator of the machine and a machine control system located at a remote monitoring station regarding the misalignment of the object detection sensor with respect to the chassis of the machine.

10. The monitoring system of claim 9, wherein the alert includes at least one of a diagnostic code, a visual notification, and an audio notification.

11. The monitoring system of claim 8, wherein the first sensor module includes an Inertial Measurement Unit (IMU).

12. The monitoring system of claim 8, wherein the first sensor module includes at least one of a pitch sensor, a roll sensor, and a yaw sensor.

13. The monitoring system of claim 8, wherein the object detection sensor includes a LIDAR.

14. The monitoring system of claim 8, wherein the second sensor module includes at least one of a pitch sensor, a roll sensor, a yaw sensor, and an IMU.

15. A method to monitor alignment of an object detection sensor coupled to a machine, wherein a first sensor module is coupled to the object detection sensor, the first sensor module configured to measure values of object detection sensor pitch, roll, and yaw, the method comprising:
receiving, by a control unit, the measured values of the object detection sensor pitch, roll, and yaw from the first sensor module;
receiving, by the control unit, measured values of chassis pitch, roll, and yaw from a second sensor module, wherein the second sensor module is coupled to a chassis of the machine;
comparing, by the control unit, the measured values of the object detection sensor and chassis pitch, roll, and yaw received from the first and second sensor modules;
determining, by the control unit, whether the measured values are within a predefined tolerance based on the comparison; and
generating an alert, by the control unit, if the measured values of the object detection sensor and chassis pitch, roll, and yaw are beyond the predefined tolerance, wherein the alert is indicative of a misalignment of the object detection sensor with respect to the chassis of the machine.

16. The method of claim 15, wherein the alert notifies at least one of an operator of the machine and a machine control system located at a remote monitoring station regarding the misalignment of the object detection sensor with respect to the chassis of the machine.

17. The method of claim 16, wherein the alert includes at least one of a diagnostic code, a visual notification, and an audio notification.

18. The method of claim 15, wherein the first sensor module includes an Inertial Measurement Unit (IMU).

19. The method of claim 15, wherein the object detection sensor includes a LIDAR.

20. The method of claim 15, wherein the second sensor module includes at least one of a pitch sensor, a roll sensor, a yaw sensor, and an IMU.

* * * * *